United States Patent
Kim et al.

(10) Patent No.: US 10,857,956 B2
(45) Date of Patent: Dec. 8, 2020

(54) POWER SUPPLY SYSTEM OF VEHICLE AND METHOD OF CONTROLLING THE SAME

(71) Applicants: Hyundai Motor Company, Seoul (KR); Kia Motors Corporation, Seoul (KR)

(72) Inventors: Yu Seok Kim, Seoul (KR); Jae Hoon Choi, Gyeonggi-do (KR); Suk Hyung Kim, Gyeonggi-Do (KR); Jin Ho Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 212 days.

(21) Appl. No.: 16/055,105

(22) Filed: Aug. 5, 2018

(65) Prior Publication Data
US 2019/0275968 A1     Sep. 12, 2019

(30) Foreign Application Priority Data
Mar. 6, 2018  (KR) .................. 10-2018-0026313

(51) Int. Cl.
| | |
|---|---|
| *B60R 1/00* | (2006.01) |
| *B60R 16/033* | (2006.01) |
| *B60L 53/22* | (2019.01) |
| *B60L 50/64* | (2019.01) |
| *B60L 58/13* | (2019.01) |
| *B60L 1/10* | (2006.01) |

(Continued)

(52) U.S. Cl.
CPC .............. *B60R 16/033* (2013.01); *B60L 1/10* (2013.01); *B60L 50/64* (2019.02); *B60L 53/22* (2019.02); *B60L 58/13* (2019.02); *B60L 58/20* (2019.02); *H02J 7/342* (2020.01); *H02J 1/082* (2020.01); *H02J 7/008* (2013.01)

(58) Field of Classification Search
CPC ............. B60R 16/00; B60L 1/00; B60L 50/00
USPC .................................................. 307/9.1, 10.1
See application file for complete search history.

(56) References Cited

U.S. PATENT DOCUMENTS

| | | | |
|---|---|---|---|
| 2003/0117019 A1* | 6/2003 | Furukawa .................. | B60L 1/02 307/10.6 |
| 2014/0183941 A1* | 7/2014 | Bae ........................ | B60L 3/0092 307/10.1 |

(Continued)

FOREIGN PATENT DOCUMENTS

| | | |
|---|---|---|
| EP | 3025897 A1 | 6/2016 |
| JP | 2016-130106 A | 7/2016 |
| KR | 10-1500080 | 3/2015 |

OTHER PUBLICATIONS

Extended European Search Report for European Patent Application No. 18187693, dated Sep. 10, 2018, 9 pages.

*Primary Examiner* — Adi Amrany
(74) *Attorney, Agent, or Firm* — Mintz Levin Cohn Ferris Glovsky and Popeo, P.C.; Peter F. Corless (57) ABSTRACT

A power supply system of a vehicle is provided. The system includes a high-voltage battery for storing power and a power relay that is disposed between the high-voltage battery and an electric load. A first converter receives the power from the high-voltage battery through the power relay and a second converter bypasses the power relay to directly receive the power from the high-voltage battery. The electric load receives the power from at least any one of the first converter and the second converter.

15 Claims, 5 Drawing Sheets

(51) Int. Cl.
    *B60L 58/20*     (2019.01)
    *H02J 7/34*     (2006.01)
    *H02J 7/00*     (2006.01)
    *H02J 1/08*     (2006.01)

(56) References Cited

U.S. PATENT DOCUMENTS

| | | | |
|---|---|---|---|
| 2016/0031440 A1 | 2/2016 | Youn et al. | |
| 2016/0152147 A1* | 6/2016 | Sasaki | B60L 1/00 307/10.1 |
| 2016/0229298 A1* | 8/2016 | Chen | B60L 50/50 |
| 2017/0023905 A1* | 1/2017 | Tsuchiya | G03G 15/80 |
| 2017/0080810 A1* | 3/2017 | Choi | B60L 11/1811 |
| 2017/0136913 A1 | 5/2017 | Yang et al. | |
| 2018/0234010 A1* | 8/2018 | Uemura | H02M 3/1584 |
| 2018/0262111 A1* | 9/2018 | Taniguchi | H02M 3/1584 |
| 2019/0220027 A1* | 7/2019 | Nakayama | B60W 50/045 |
| 2019/0322177 A1* | 10/2019 | Shirahashi | H02M 3/156 |

* cited by examiner

FIG. 1

RELATED ART

POWER SUPPLY SYSTEM OF VEHICLE AND METHOD OF CONTROLLING THE SAME

CROSS REFERENCE TO RELATED APPLICATION

The present application claims priority of Korean Patent Application No. 10-2018-0026313 filed on Mar. 6, 2018, the entire contents of which is incorporated herein for all purposes by this reference.

BACKGROUND

Field of the Disclosure

The present disclosure relates to a power supply system of a vehicle and a method of controlling the same, and more particularly, to a system and a method of controlling the same, which remove a low-voltage battery and supply power of a vehicle using power of a high-voltage battery.

Description of the Related Art

As is well known today, a vehicle with an internal combustion engine using fossil fuel as fuel causes environmental pollution due to exhaust gas, global warming due to carbon dioxide, respiratory diseases due to ozone generation, etc. Accordingly, various eco-friendly vehicles, such as a pure electric vehicle (EV) that is driven using an electric motor, a hybrid vehicle (HEY) that is driven using an engine and an electric motor, and a fuel cell electric vehicle (FCEV) that is driven by operating an electric motor by power generation using a fuel cell, have been actively developed.

Figure 1:
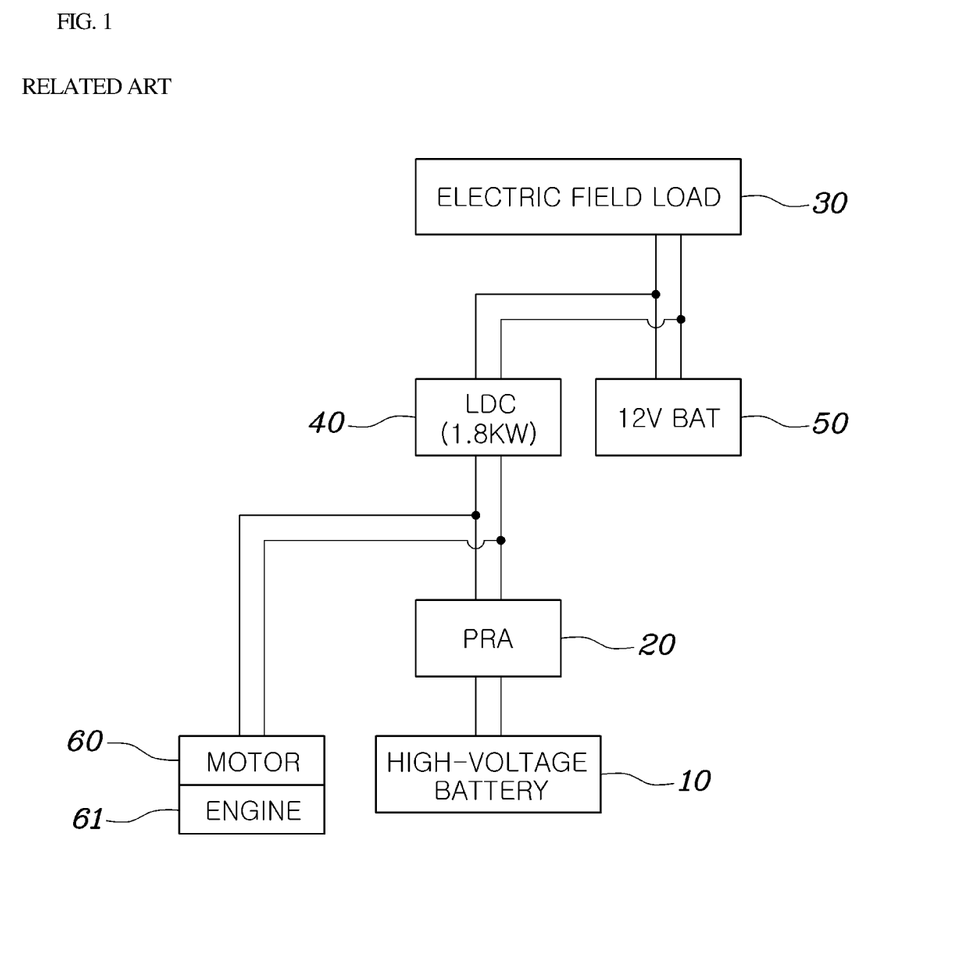
FIG. 1 is a configuration diagram of a power supply system of a vehicle in accordance with the related art.

Particularly, the eco-friendly vehicle is equipped with a power supply system including a power conversion device, etc. FIG. 1 is a configuration diagram of a power supply system in accordance with the related art Referring to FIG. 1, the power supply system in accordance with the related art includes a high-voltage battery 10 and a low-voltage battery (12V BAT) 50, disposed separately. The low-voltage battery (12V BAT) 50 supplies power to an electric load 30 in the start-OFF state of a vehicle, and supplies power to a controller (not shown) to turn on the power relay (PRA) 20 when the vehicle changes to an ON state, to thus supply the power of the high-voltage battery 10 to a motor 60. The motor 60 receives the power of the high-voltage battery 10 to crank an engine 61 as the power relay (PRA) 20 turns ON.

The power of the high-voltage battery 10 is supplied to the electric load 30 via the power conversion of a converter (LDC) 40 in the start-ON state of the vehicle. In other words, the power of the high-voltage battery 10 is supplied to the electric load 30 in the start-ON state of the vehicle, but the power of the low-voltage battery 50 is supplied to the electric load 30 in the start-OFF state of the vehicle. Accordingly, the eco-friendly vehicle simultaneously uses two batteries of the high-voltage battery 10 supplying the power of high-voltage (e.g., 60V or more) and the low-voltage battery 50 supplying the power of low voltage (e.g., 12V). In addition, when the charging amount of the low-voltage battery 50 is insufficient, the power of the high-voltage battery 10 is converted into the voltage through the converter (LDC) 40 to charge the low-voltage battery 50.

However, by additionally mounting the low-voltage battery other than the high-voltage battery to the vehicle, additional cost and space were required. In addition, the inconvenience was the problem in that the vehicle could not be started without supplying external power when the low-voltage battery was discharged in the start-OFF state of the vehicle.

The foregoing is intended merely to aid in the understanding of the background of the present disclosure, and is not intended to mean that the present disclosure falls within the purview of the related art that is already known to those skilled in the art.

SUMMARY

The present disclosure is intended to solve the problem, and the object of the present disclosure is to provide a power supply system of a vehicle and a method of controlling the same, which supply power to a vehicle using only a high-voltage battery without mounting a low-voltage battery to the vehicle.

A power supply system of a vehicle in accordance with the present disclosure for achieving the object may include a high-voltage battery configured to store power; a power relay prepared between the high-voltage battery and an electric load; a first converter configured to receive the power from the high-voltage battery through the power relay; a second converter configured to directly receive the power from the high-voltage battery by bypassing the power relay; the electric load configured to receive the power from at least any one of the first converter and the second converter; and a controller configured to operate the power relay, the first converter or the second converter based on a start state of a vehicle.

The power supply system of the vehicle may further include a motor branched between the power relay and the first converter to receive the power from the high-voltage battery through the power relay. A power conversion capacity of the first converter may be greater than a power conversion capacity of the second converter.

The controller may be configured to supply the power of the high-voltage battery to the first converter by connecting the power relay when the vehicle is in an ON state. Additionally, the controller may be configured to stop an operation of the first converter when a failure of the first converter is detected and the power relay is connected. The controller may be configured to block the power of the high-voltage battery supplied to the first converter by blocking the connection of the power relay when the vehicle is in an OFF state.

The power supply system of the vehicle may further include a power storage device interposed between the second converter and the electric load and configured to store the power supplied from the second converter. The controller may be configured to operate the second converter based on a charging state of the power storage device when the vehicle is in an OFF state. Additionally, the power supply system of the vehicle may include an auxiliary relay interposed between the second converter and the electric load, and for connecting or blocking the power supplied from the second converter to the electric load. The controller may be configured to determine the discharging possibility of the high-voltage battery and operate the auxiliary relay based on the determined discharging possibility when the vehicle is in an OFF state. The auxiliary relay may be connected as a manual key of the vehicle is rotated to connect the power supplied from the second converter to the electric load.

A method of controlling a power supply system of a vehicle in accordance with the present disclosure for achieving the object may include determining a start state of a vehicle; and connecting the power relay so that power of a high-voltage battery is supplied to a first converter when a vehicle is in an ON state, and disconnecting the power relay so that the power of the high-voltage battery is not supplied to the first converter when the vehicle is in an OFF state.

The method of controlling the power supply system of the vehicle may further include detecting a failure of the first converter when the power relay is connected, after connecting or blocking the power relay; and stopping an operation of the first converter when the first converter has failed. The second converter may be continuously operated regardless of the start state of the vehicle.

Additionally, the method of controlling the power supply system of the vehicle may include determining a start state of a vehicle; connecting the power relay so that power of a high-voltage battery is supplied to a first converter when a vehicle is in an ON state, and disconnecting the power relay so that the power of the high-voltage battery is not supplied to the first converter when the vehicle is in an OFF state; and detecting a charging state of a power storage device, and operating the second converter based on the detected charging state when the vehicle is in an OFF state.

According to the power supply system of the vehicle and the method of controlling the same of the present disclosure, there is the effect that reduces cost and weight of the vehicle by not including the configuration of the low-voltage battery. In addition, there is the effect that enhances converting efficiency of the entire power supply system by selectively using the first converter and the second converter depending upon the required power of the electric load.

Further, a Fail-Safe control may be performed using the second converter upon failure of the first converter. In addition, heat generation power and loss power of the second converter may be minimized by operating the second converter intermittently by adding the power storage device. The discharge of high-voltage battery due to the dark current may be prevented by adding the auxiliary relay.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of the exemplary embodiments of the present disclosure disclosed in the specification or application are only for the purpose of illustrating the embodiments of the present disclosure, and the exemplary embodiments in accordance with the present disclosure can be embodied in various forms and should not be construed as limited to the exemplary embodiments set forth in the specification or application.

Various modifications and various forms may be made in the exemplary embodiments in accordance with the present disclosure, so that specific exemplary embodiments are illustrated in the drawings and described in detail in the specification or application. It should be understood, however, that it is not intended to limit the exemplary embodiments in accordance with the concepts of the present disclosure to the particular disclosed forms, but includes all modifications, equivalents, and alternatives falling within the sprit and technical scope of the present disclosure.

The terms "first" and/or "second," and the like are used to illustrate various components, but the components should not be limited by the terms. The terms are used to differentiate one element from another, for example, a first component may be referred to as a second component, and similarly, the second component may be also referred to as the first component without departing from claims in accordance with the concepts of the present disclosure.

It will be understood that when an element is referred to as being "connected" or "coupled" to another element, it can be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, the present disclosure will be described in detail by explaining the exemplary embodiments of the present disclosure with reference to the accompanying drawings. The same reference numerals denoted in each drawing represent the same members.

Figure 2:
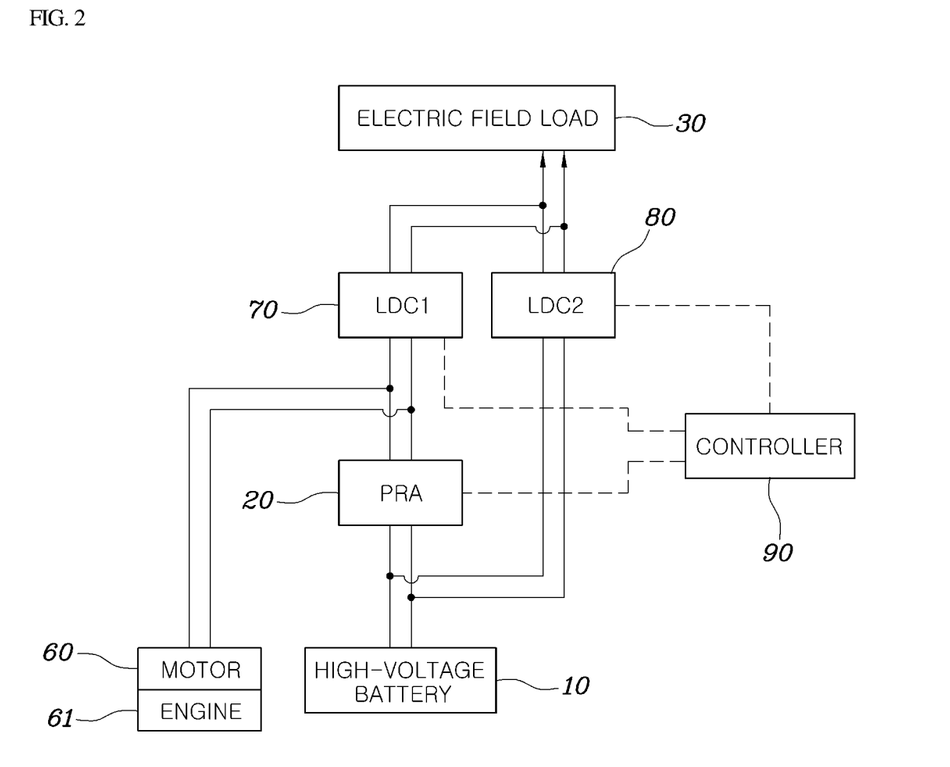
FIGS. 2 to 4 are configuration diagrams of a power supply system of a vehicle in accordance with one exemplary embodiment of the present disclosure.

FIG. 2 is a configuration diagram of a power supply system of a vehicle in accordance with one exemplary embodiment of the present disclosure. Referring to FIG. 2, a power supply system of a vehicle in accordance with one exemplary embodiment of the present disclosure may include a high-voltage battery 10 configured to store power; a power relay 20 disposed between the high-voltage battery 10 and an electric load 30; a first converter 70 configured to receive the power from the high-voltage battery 10 through the power relay 20; a second converter 80 configured to directly receive the power from the high-voltage battery 10 by bypassing the power relay 20; the electric load 30 configured to receive the power from at least any one of the first converter 70 and the second converter 80; and a controller 90 configured to operate the power relay 20, the first converter 70, or the second converter 80 based on a start state of a vehicle.

The high-voltage battery 10 may, as the battery for storing the charging power, be configured to supply a high voltage of 60V or greater. The high-voltage battery 10 may be connected with the electric load 30. The electric load 30 may receive the power from at least any one of the first converter 70 and the second converter 80. The power relay (Power Relay Assembly: PRA) 20, as the relay operated based on a start state of the vehicle, is the relay that may be maintained as an OFF state in the start-OFF state of the vehicle and connected when the vehicle is turned ON. A control device (not shown) configured to turn on the power relay 20 for the start of the vehicle may be included in the electric load 30, and the control device (not shown) may be separately connected to the electric load 30 to turn on the power relay 20 by the power supplied from the second converter 80 in the start-OFF state of the vehicle.

The electric load 30 may be operated by the low-voltage power of about 12V, and for this purpose, the power supplied from the high-voltage battery 10 may be converted into the low voltage through the first converter 70 or the second converter 80 to be supplied to the electric load 30. The first converter 70 may be configured to receive the power from the high-voltage battery through the power relay 20, and supply the power to the electric load 30. The second converter 80 may be configured to bypass the power relay 20 to directly receive the power from the high-voltage battery 10, and supply the power to the electric load 30. In other words, the second converter 80 may be continuously operated, and the first converter 70 may be operated only when the power relay 20 becomes ON (e.g., is turned on/connected). Accordingly, by removing the configuration of the low-voltage battery in the power supply system of the vehicle, the power may be supplied to the electric load 30 requiring the power of the low voltage while reducing cost and weight.

A power conversion capacity of the first converter 70 may be greater than a power conversion capacity of the second converter 80. In other words, the first converter 70 may have a substantial power conversion capacity in Kilowatt (kW) to supply sufficient power to the electric load 30 in the start-ON state of the vehicle, and since a minimal amount power is required in the start-ON state of the vehicle, the second converter 80 may have a minimal power conversion capacity in watt (W) to supply a dark current and a standby power in the start-OFF state of the vehicle. The second converter 80 may use a minimal power conversion capacity and a low-cost converter. The first converter 70 has a power conversion capacity of several Kilowatt (kW), and the second converter 80 has a power conversion capacity of tens to hundreds of watt (W).

Generally, the converter has a low converting efficiency in a low-current region. Accordingly, by the configuration that supplies the power using the first converter 70 in the start-ON state that requires a substantial amount of power for the electric load 30, and supplies the power using the second converter 80 in the start-OFF state that requires a minimal amount of power for the electric load 30, the converting efficiency of the entire system may be increased.

In addition, the first converter 70 and the second converter 80 are not limited to the configuration composed of two converters separately divided, but may be formed by dividing into a circuit inside one housing. Particularly, by dividing the converter having one housing into a plurality of circuits, a circuit that will operate among the plurality of circuits divided based on the required amount of power for the electric load 30 may be selected. In other words, as the required amount of power increases, the number of circuits to be operated may increase to accommodate a substantial power conversion capacity, and as the required amount of power decreases, the number of circuits to be operated to enhance conversion efficiency may decrease.

The power supply system of the vehicle may further include a motor 60 branched between the power relay 20 and the first converter 70 to receive the power from the high-voltage battery 10 through the power relay 20. The motor 60 may be configured to receive the power of the high-voltage battery 10 when the power relay 20 is turned ON. An inverter may be further disposed between the motor 60 and the power relay 20. The motor 60, as an electric motor 60, may operate the vehicle, and crank the engine 61 upon the start of the vehicle.

The controller 90 may be included in a Battery Management System (BMS) or an Energy Management System (EMS), and may be an Electronic Control Unit (ECU) that is a host controller 90, etc. The controller 90 may be configured to operate the power relay 20, the first converter 70 or the second converter 80 based on the start state of the vehicle. Specifically, the controller 90 may be configured to supply the power of the high-voltage battery 10 to the first converter 70 by connecting the power relay 20 the high-voltage battery 10 when the vehicle is in an ON state. Additionally, the controller 90 may block the power of the high-voltage battery 10 supplied to the first converter 70 by blocking the connection of the power relay 20 with the high-voltage battery 10 when the vehicle is in an OFF state.

Further, the controller 90 may be configured to continuously operate the second converter 80. In other words, the second converter 80 may be continuously operated regardless of the start-ON/OFF of the vehicle. Alternately, the controller 90 may be configured to operate the second converter 80 only when the vehicle is in an OFF state, and the first converter 70 may be operated when the vehicle is in an ON state to stop the operation of the second converter 80. The controller 90 also be configured to continuously operate the first converter 70. Alternately, the controller 90 may be configured to operate the first converter 70 together with the power relay 20 to operate the first converter 70 when the power relay 20 is connected, and stop the operation of the first converter when the connection of the power relay 20 is blocked.

The controller 90 may be configured to stop the operation of the first converter 70 when a failure of the first converter 70 is detected and the power relay 20 is connected. In response to detecting an error in the operation of the first converter 70 such as abnormal power conversion of the first converter 70 or a dangerous level of heat generation, the first converter 70 may be determined to malfunction and thereby the operation of the first converter 70 may be stopped. In particular, when the operation of the first converter 70 is stopped, the controller 90 may be configured to operate the vehicle to move to a safe place by supplying a minimal power to the electric load using the second converter 80. Accordingly, upon failure of the first converter 70, a Fail-Safe control may be executed using the second converter 80.

Figure 3:
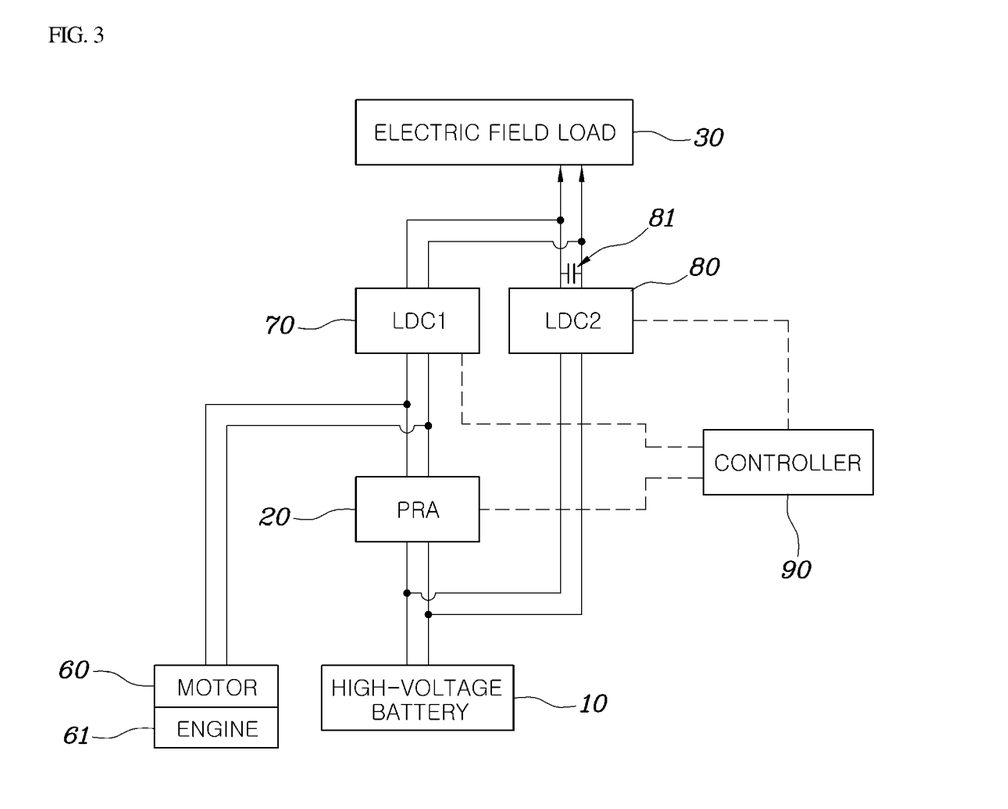

FIG. 3 is a configuration diagram of the power supply system of the vehicle in accordance with another exemplary embodiment of the present disclosure. Referring to FIG. 3, the power supply system of the vehicle in accordance with another exemplary embodiment of the present disclosure may further include a power storage device 81 interposed between the second converter 80 and the electric load 30 to store the power supplied from the second converter 80.

The power storage device 81 may be a device configured to store an electric energy such as a capacitor, a super capacitor, or an Electrical Double Layer Capacitor (EDLC). The power storage device 81 may be configured to store the power supplied from the second converter 80, and supply the power to the electric load 30 while discharging when the operation of the second converter 80 is stopped. The power storage device 81 may have a lower charging capacity and a lower price than a conventional low-voltage battery, and according to this configuration, may be configured to supply the power to the electric load 30 when the operation of the second converter 80 is stopped.

Particularly, the controller 90 may be configured to operate the second converter 80 based on the charging state of the power storage device 81 when the vehicle is in an OFF state. Since the power storage device 81 may be configured to store a minimal amount of energy, the power storage device 81 may be configured to supply the power to the electric load 30 while discharged when the electric load 30 requires only a dark current (e.g., about 10 mA) when the vehicle is in an OFF state.

In particular, the controller 90 may be configured to monitor the charging state of the power storage device 81, and operate the second converter 80 based on the charging state of the monitored power storage device 81. When the power storage device 81 is in the charging state that exceeds the preset charging amount (for example, 100[%] of maximum charging amount), the operation of the second converter 80 may be stopped, and only when the power storage device 81 is equal to or less than the preset charging amount may the second converter 80 be operated to charge the power storage device 81. Accordingly, heat generation and loss power due to a switching inside the second converter 80 may be minimized as the second converter 80 operates intermittently.

Figure 4:
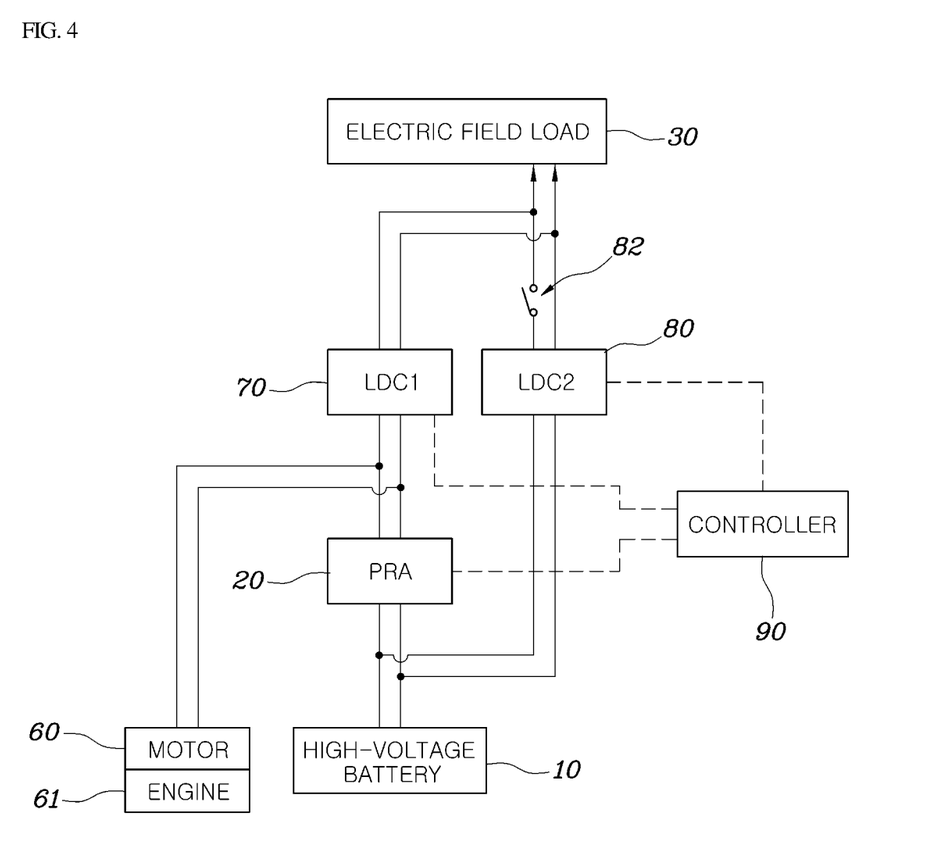

FIG. 4 is a configuration diagram of the power supply system of the vehicle in accordance with yet another exemplary embodiment of the present disclosure. Referring to FIG. 4, the power supply system of the vehicle in accordance with yet another exemplary embodiment of the present disclosure may further include an auxiliary relay 82 interposed between the second converter 80 and the electric load 30 to connect or block the power supplied from the second converter 80 to the electric load 30.

When the dark current is excessively consumed such as the start-off state of the vehicle is maintained for a substantial period of time, the high-voltage battery 10 may be discharged. Accordingly, the auxiliary relay 82 may connect or block the power supplied from the second converter 80 to the electric load 30. The auxiliary relay 82 may be mounted inside the second converter 80 to block the power supply to the electric load 30.

Particularly, the controller 90 may be configured to determine the discharging possibility of the high-voltage battery 10, and operate the auxiliary relay 82 based on the determined discharging possibility when the vehicle is in an OFF state. The discharging possibility of the high-voltage battery 10 may be determined based on whether the start-OFF maintenance time of the vehicle is equal to or greater than a preset time, or based on the charging amount of the high-voltage battery 10 monitored by monitoring the charging amount (e.g., state of charge SOC) of the high-voltage battery 10.

Further, the controller 90 may be configured to operate the auxiliary relay 82 to block the power supplied from the second converter 80 to the electric load 30 in response to determining that the discharging possibility of the high-voltage battery 10 is high. Accordingly, the high-voltage battery 10 may be prevented from being discharged due to the dark current. In addition, the auxiliary relay 82 may be connected as the manual key of the vehicle is rotated to connect the power supplied from the second converter 80 to the electric load 30. Specifically, the manual key of the vehicle is formed with a pinion gear, a rack gear that linearly moves by the rotational motion of the pinion gear may be connected to the pinion gear, and the auxiliary relay 82 may be connected by the linear motion of the rack gear. When the auxiliary relay 82, as a latch type, is connected by the linear motion of the rack gear, the connected state may be maintained even when the rack gear returns to an original position.

In other words, the auxiliary relay 82 may be connected as the manual key of the vehicle is rotated, and thereby may connect the power supplied from the second converter 80 to the electric load 30. The manual key of the vehicle may be a key holder used to unlock the driver's door of the vehicle, or a key holder for the start of the vehicle. When the auxiliary relay 82 is blocked by the discharging possibility determination of the high-voltage battery 10, the electric load 30 is unable start the vehicle since the power has not been supplied thereto. Accordingly, the low-voltage power may be supplied to the electric load 30 to thus start the vehicle by the rotational motion of the manual key for the driver to enter the vehicle.

Figure 5:
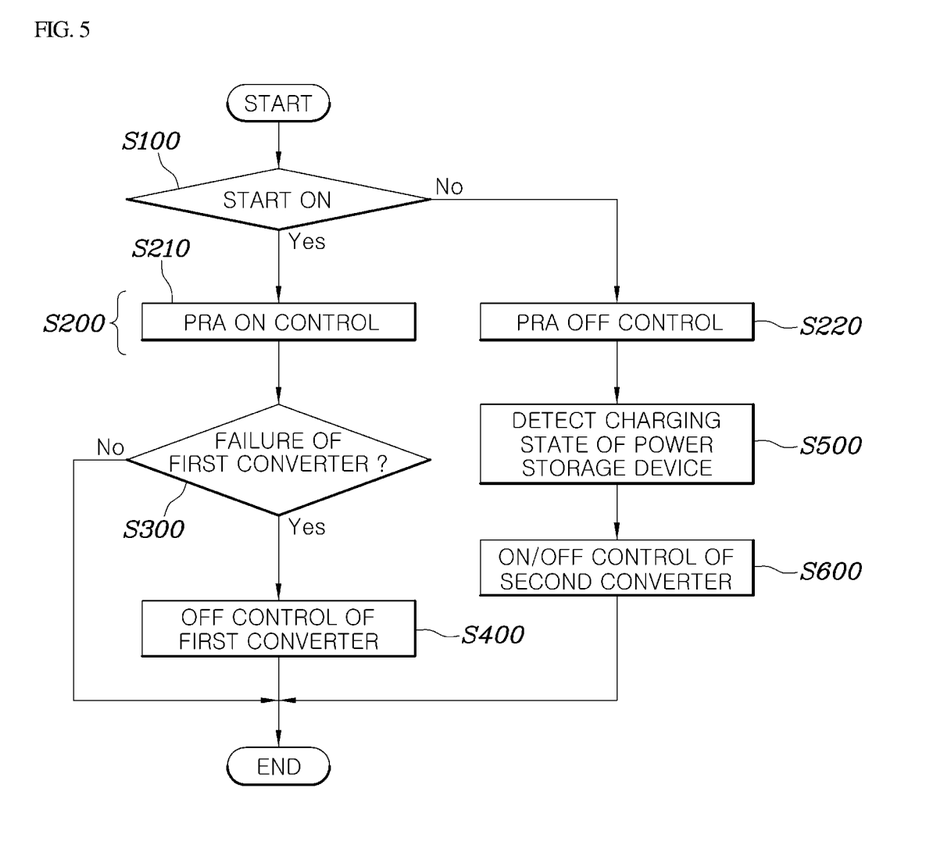
FIG. 5 is a flowchart of a method of controlling the power supply system of the vehicle in accordance with one exemplary embodiment of the present disclosure.

FIG. 5 is a flowchart of a method of controlling the power supply system of the vehicle in accordance with one exemplary embodiment of the present disclosure. The method described herein below may be executed by the controller 90 having a processor and a memory. Further referring to FIG. 5, the method of controlling the power supply system of the vehicle in accordance with one exemplary embodiment of the present disclosure can include determining the start state of the vehicle (S100), and operating the power relay 20 to be connected to supply power of a high-voltage battery 10 to a first converter 70 when a vehicle is in an ON state, and disconnecting the power relay 20 from the battery to block the power supply of the high-voltage battery 10 from the first converter 70 when the vehicle is in an OFF state (S200).

In particular, the controller 90 may be configured to connect the power relay 20 to the high-voltage battery 10 when the vehicle is in an ON state (S210), and to block the power relay 20 when the vehicle is in an OFF state (S220) by disconnecting the power relay 20 from the high-voltage battery 10. When the power relay 20 is connected to the high-voltage battery 10, the controller 90 may be configured to detect a failure of the first converter 70, and when the first converter 70 has failed, the controller 90 may be configured to stop the operation of the first converter 70. In particular, the controller 90 may be configured to stop the operation of the first converter 70, and perform a FAIL-SAFE control for the vehicle to guide the vehicle to a safe place by supplying a minimal power to the electric load from the second converter 80.

The controller 90 may be configured to continuously operate the second converter 80 regardless of the start state of the vehicle. In other words, the controller 90 may be configured to continuously operate the second converter 80 both when the vehicle is in an ON state and in an OFF state (not shown). Alternately, the controller 90 may further be configured to detect the charging state of the power storage device 81 when the vehicle is in an OFF state (S500), and operate the second converter 80 based on the detected charging state (S600). In other words, the controller 90 may be configured to detect the charging state of the power storage device 81 in the exemplary embodiment illustrated in FIG. 3 (S500), and operate or stop the second converter 80 based on the charging state of the detected power storage device 81 (S600).

In other words, the controller 90 may be configured to detect the charging state of the power storage device 81 (S500), turn off the operation of the second converter 80 when the charging amount of the power storage device 81 is equal to or greater than the preset charging amount, and supply the power to the electric load 30 while charging the power storage device 81 by operating the second converter 80 again when the charging amount of the power storage device 81 is less than the preset charging amount.

In addition, the controller 90 may be configured to determine the discharging possibility of the high-voltage battery 10, and operate the auxiliary relay 82 based on the determined discharging possibility when the vehicle is in an OFF state. The controller 90 may be configured to operate the auxiliary relay 82 in the exemplary embodiment illustrated in FIG. 4 to block the auxiliary relay 82 when the discharging possibility of the high-voltage battery 10 is high. In other words, the controller 90 may be configured to monitor the charging amount of the high-voltage battery 10, or confirm the start-OFF maintenance time of the vehicle to determine the discharging possibility of the high-voltage battery 10, and based on the above, and may be configured to block the auxiliary relay 82 when the discharging possibility of the high-voltage battery 10 is high.

Although the present disclosure has been shown and described in connection with the specific exemplary embodiments, those skilled in the art will appreciate that the present disclosure can be variously modified and changed without departing from the technical spirit of the present disclosure as disclosed in the accompanying claims.

What is claimed is:

1. A power supply system of a vehicle, comprising:
   a high-voltage battery configured to store power;
   a power relay configured to supply and block power of the high-voltage battery;
   a first converter configured to receive the power from the high-voltage battery through the power relay, wherein the power relay is disposed between the high-voltage battery and the first converter;
   a second converter configured to directly receive the power from the high-voltage battery by bypassing the power relay through a branch line between the power relay and the high-voltage battery;
   an electric load configured to receive the power from at least any one of the first converter and the second converter; and
   a controller configured to operate the power relay, the first converter or the second converter based on the start state of a vehicle.

2. The power supply system of the vehicle according to claim 1, further comprising:
   a motor branched between the power relay and the first converter to receive the power from the high-voltage battery through the power relay.

3. The power supply system of the vehicle according to claim 1, wherein a power conversion capacity of the first converter is greater than a power conversion capacity of the second converter.

4. The power supply system of the vehicle according to claim 1, wherein the controller is configured to supply the power of the high-voltage battery to the first converter by connecting the power relay to the high-voltage battery when the vehicle is in an ON state.

5. The power supply system of the vehicle according to claim 4, wherein the controller is configured to stop an operation of the first converter when a failure of the first converter is detected and the power relay is closed to connect the high-voltage battery to the first converter.

6. The power supply system of the vehicle according to claim 1, wherein the controller is configured to block the power of the high-voltage battery supplied to the first converter by blocking the connection of the power relay to the high-voltage battery when the vehicle is in an OFF state.

7. The power supply system of the vehicle according to claim 1, further comprising:
   a power storage device interposed between the second converter and the electric load, and configured to store the power supplied from the second converter.

8. The power supply system of the vehicle according to claim 7, wherein the controller is configured to operate the second converter based on a charging state of the power storage device when the vehicle is in an OFF state.

9. The power supply system of the vehicle according to claim 1, further comprising:

an auxiliary relay interposed between the second converter and the electric load and configured to connect or block the power supplied from the second converter to the electric load.

10. The power supply system of the vehicle according to claim 9, wherein the controller is configured to determine the discharging possibility of the high-voltage battery, and operate the auxiliary relay based on the determined discharging possibility when the vehicle is in an OFF state.

11. The power supply system of the vehicle according to claim 9, wherein the auxiliary relay is connected as a manual key of the vehicle and is rotated to connect the power supplied from the second converter to the electric load.

12. A method of controlling a power supply system of a vehicle of claim 1, comprising:
   determining, by the controller, a start state of a vehicle; and
   operating, by the controller, the power relay to be connected with the high-voltage battery to supply the power of a high-voltage battery to a first converter when a vehicle is in an ON state, and disconnecting the power relay to block the supply of the power of the high-voltage battery to the first converter when the vehicle is in an OFF state.

13. The method of controlling the power supply system of the vehicle according to claim 12, further comprising:
   detecting, by the controller, a failure of the first converter when the power relay is closed to connect the high-voltage battery to the first converter; and
   stopping, by the controller, an operation of the first converter when the first converter has failed.

14. The method of controlling the power supply system of the vehicle according to claim 12, further comprising:
   continuously operating, by the controller, the second converter regardless of a start state of the vehicle.

15. A method of controlling a power supply system of claim 7, comprising:
   determining, by the controller, a start state of a vehicle;
   operating, by the controller, the power relay to supply the power of a high-voltage battery to a first converter when the vehicle is in an ON state, and operating the power relay to block the power of the high-voltage battery from being supplied to the first converter when the vehicle is in an OFF state; and
   detecting, by the controller, a charging state of a power storage device, and operating the second converter based on the detected charging state when the vehicle is in an OFF state.

* * * * *